(12) United States Patent
Cragun et al.

(10) Patent No.: US 9,471,901 B2
(45) Date of Patent: Oct. 18, 2016

(54) ACCESSIBLE WHITE SPACE IN GRAPHICAL REPRESENTATIONS OF INFORMATION

(75) Inventors: Brian J. Cragun, Rochester, MN (US); Mary J. Mueller, Austin, TX (US); James S. Taylor, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 13/230,151

(22) Filed: Sep. 12, 2011

(65) Prior Publication Data

US 2013/0066926 A1    Mar. 14, 2013

(51) Int. Cl.
  *G06F 17/30* (2006.01)
  *G06Q 10/10* (2012.01)
  *G06F 17/21* (2006.01)

(52) U.S. Cl.
  CPC ..... *G06Q 10/1093* (2013.01); *G06F 17/30011* (2013.01); *G06F 17/211* (2013.01)

(58) Field of Classification Search
  CPC .. G06F 17/243; G06F 17/211; G06F 17/212; G06F 17/30011
  USPC ........................................................ 707/810
  See application file for complete search history.

(56) References Cited

U.S. PATENT DOCUMENTS

| 5,473,745 | A | 12/1995 | Berry et al. | |
| 6,681,208 | B2 * | 1/2004 | Wu | G10L 19/00 704/258 |
| 7,707,508 | B1 * | 4/2010 | Moskalonek et al. | 715/762 |
| 2003/0061048 | A1 | 3/2003 | Wu et al. | |
| 2003/0152293 | A1 * | 8/2003 | Bresler et al. | 382/305 |
| 2010/0162105 | A1 | 6/2010 | Beebe et al. | |
| 2011/0215151 | A1 * | 9/2011 | Li | G06K 7/10 235/462.01 |
| 2011/0267643 | A1 * | 11/2011 | Mastie | G06F 3/1219 358/1.15 |
| 2012/0321009 | A1 * | 12/2012 | Chintalapudi | H04B 1/00 375/267 |

FOREIGN PATENT DOCUMENTS

| CN | 101414356 A | 4/2009 |
| WO | WO03063067 A1 | 7/2003 |

OTHER PUBLICATIONS

International Search Report and Written Opinion dated Jan. 10, 2013 for International Application No. PCT/IB2012/054451, 10 pages.
Yu, Wai et al., "Web-Based Multimodal Graphs for Visually Impaired People", Proceedings of the 1st Cambridge Workshop on Universal Access and Assistive Technology (CWUAAT), Mar. 25-27, 2002, 14 pages.

* cited by examiner

*Primary Examiner* — Tony Mahmoudi
*Assistant Examiner* — Merilyn Nguyen
(74) *Attorney, Agent, or Firm* — Francis Lammes; Stephen J. Walder, Jr.; William J. Stock

(57) ABSTRACT

Mechanisms are provided for representing white space in a graphical representation of a data model. These mechanisms involve analyzing output data that is to be output to a user via an output device, to identify white spaces in the output data. White spaces comprise portions of a range of metrics of output data values where the output data does not have data objects representing those portions of the range of metrics of output data. For each identified white space, a white space data object is created. The white space data objects are provided to an application which performs an operation on the white space data objects to output the white space data objects in a manner that identifies the white space data objects differently from non-white space data objects in the output data.

21 Claims, 3 Drawing Sheets

ACCESSIBLE WHITE SPACE IN GRAPHICAL REPRESENTATIONS OF INFORMATION

BACKGROUND

The present application relates generally to an improved data processing apparatus and method and more specifically to mechanisms for making white space in graphical representations of information more accessible to users.

It is generally accepted in modern society to represent various types of information in the form of graphical representations of various types. For example, various diagrams, charts, graphs, and the like, are often used to represent data in a graphical manner to assist in cognitive understanding by users viewing these representations. These graphical representations provide a means for expressing concepts and relationships about the underlying data in an easy to understand manner.

Some users may not be able to fully understand such graphical representations due to limitations of the user. For example, blind users, partially blind users, or even those with limited eyesight either cannot, or have significant difficulty in, perceiving the information, concepts, and relationships that are intended to be conveyed by the graphical representations. Mechanisms have been devised to assist such users with perceiving the graphical representations of such information by providing readers that audibly announce the text and objects shown in the graphical representations. One example of such a mechanism is described in, for example, Yu et al., "Web based Multimodal Graphs for Visually Impaired People," 1$^{st}$ Cambridge Workshop on Universal Access and Assistive Technology (CWUAAT), 25-27 Mar. 2002, Cambridge, England.

SUMMARY

In one illustrative embodiment, a method in a data processing system comprising at least one hardware-implemented processor, for representing white space in a graphical representation of a data model is provided. The method comprises analyzing, by the data processing system, output data that is to be output to a user via an output device, to identify white spaces in the output data. White spaces comprise portions of a range of metrics of output data values where the output data does not have data objects representing those portions of the range of metrics of output data. The method also comprises creating, by the data processing system, for each identified white space, a white space data object. Moreover, the method comprises providing, by the data processing system, the white space data objects to an application running in the data processing system or a different data processing system. In addition, the method comprises performing, by the application running in the data processing system or a different data processing system, an operation on the white space data objects to output the white space data objects in a manner that identifies the white space data objects differently from non-white space data objects in the output data.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
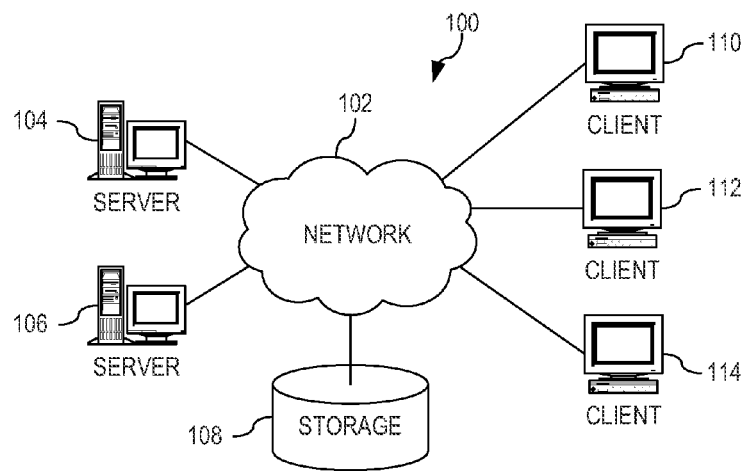
FIG. 1 is an example diagram of a distributed data processing system in which aspects of the illustrative embodiments may be implemented.

The illustrative embodiments provide a mechanism for enhancing the accessibility of white space in graphical representations of information such that visually impaired users are able to perceive these white spaces. Graphical representations of information may convey the information, concepts, relationships, etc. not only by the text and objects that are present in these graphical representations, but also with the absence of such text and objects in these graphical representations, i.e. the white spaces of the graphical representations where no text, graphical objects, or graphical elements are present in the graphical representation. That is, diagrams and the like may visually communicate important information by showing nothing where there is no content or relationship. For example, a diagram of when people are busy on tasks implicitly also shows, via absence or white space, when these people are not busy and therefore available.

As mentioned above, visually impaired users are often not able to perceive, or find it very difficult to perceive, the information in graphical representations. As a result, reading mechanisms have been devised that taken the data corresponding to a graphical representation of information and read or speak the data in an audible manner such that the user who cannot see or has difficulty seeing the graphical representation, can be informed of the data by hearing the spoken representation of the data.

However, even with such mechanisms, it is still particularly difficult to make white space accessible to the visually impaired users because no data is present and therefore cannot be spoken by the reader mechanisms. As a result, the information or knowledge that the user is supposed to obtain from the graphical representation is difficult for the visually impaired user to glean using existing technology because the only current solution is for the user to review the spoken data and build a mental model of the data present in the graphical representation and mentally calculate the portions of the graphical representation where data is not present. This is a time consuming manual process with a high potential for error.

Moreover, as the data points of a data model used to generate the graphical representation increase, the problem of identifying white space in such representations becomes intractable. For example, if a visually impaired person need to find multiple available resources to complete a task over a long period of time, it can become nearly impossible to create and remember a mental model of resource availability.

The illustrative embodiments provide a mechanism for representing areas of a graphical representation of data or information in which there is no text or graphical elements, i.e. white space, such that these areas may be presented to the user in an audible manner. In particular, the illustrative embodiments provide a function, application, applet, or other executable software implemented and/or hardware implemented code to implement a functionality for converting white spaces to data objects that may be navigable and able to be identified by a screen reader or other application that converts data objects to audible outputs. The function, application, applet, or other executable software code implementing the mechanisms of the illustrative embodiments are provided in a manner that they be may invoked by applications, a user, or the like. For example, the mechanisms of the illustrative embodiments may be implemented in a library and may be accessible via an operating system of application library call to the library to invoke the functionality of the mechanism of the illustrative embodiments. Alternatively, the mechanisms of the illustrative embodiments may be implemented in hardware circuitry, firmware, or the like, which may be invoked by an operating system, application, or the like, via a device driver or the like.

The mechanisms of the illustrative embodiments receive input data which may be the raw data upon which a graphical representation is to be generated, or data specifying the graphical representation of the raw data. In either case, the input data to the mechanisms of the illustrative embodiments is analyzed by the mechanisms of the illustrative embodiments to identify gaps between data, data objects, or the like, that are indicative of white space, i.e. areas where data is not present or areas where the graphical representation will not have text or graphical elements. The mechanisms of the illustrative embodiments convert these identified white space areas into white space data objects. Thus, portions of the data where there are no data objects are now represented as white space objects. As a result, these white space objects are rendered navigable and perceivable by other applications. A user, for example, may request that a screen reader implementing the mechanisms of the illustrative embodiments, read out or speak the white space objects in a similar manner that known screen readers are able to read out or speak existing data objects of actual data that is represented in the graphical representation. Thus, the mechanisms of the illustrative embodiments make white space in a graphical representation of data/information perceivable by visually impaired users.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
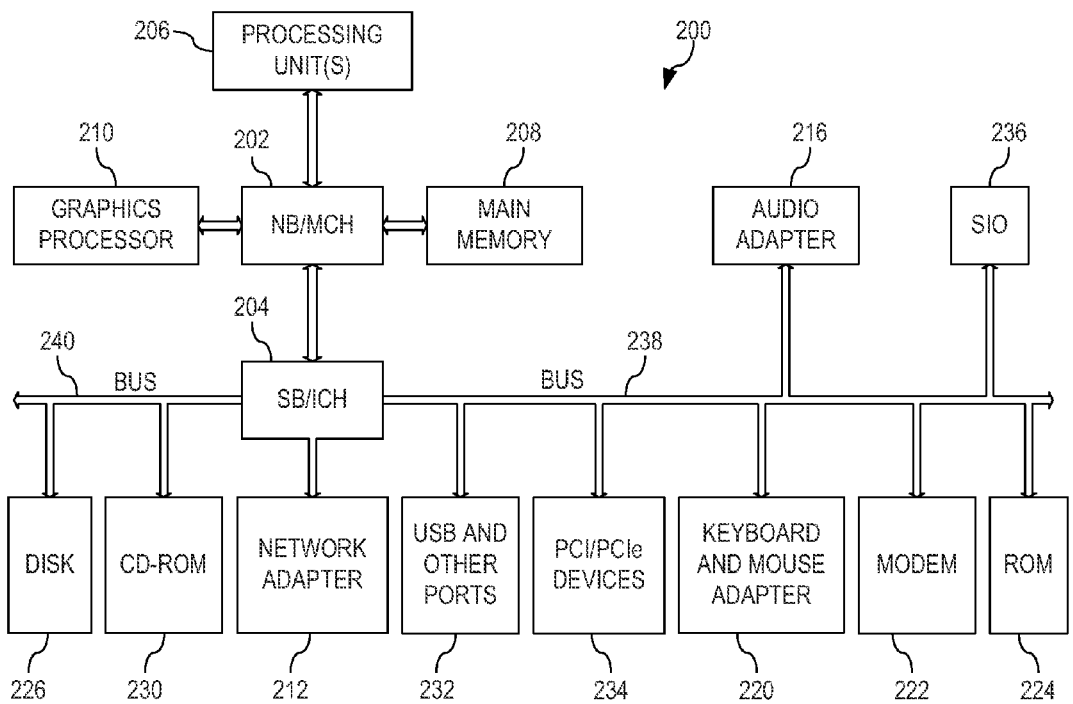
FIG. 2 is an example diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

As discussed above, the illustrative embodiments provide mechanisms for making white space in graphical representations of data/information perceivable to visually impaired users. As such, the mechanisms may be implemented entirely within a stand-alone computer, such as shown in FIG. 2. Alternatively, the mechanisms of the illustrative embodiments may be implemented in a distributed data processing system such that, for example, the mechanisms of the illustrative embodiments may be provided on a server, e.g., servers 104 and 106 in FIG. 1, and may be used by an application running on a client computer, such as clients 110-114, to render white space navigable or by an application running on a server that then presents the resulting output to a client computing device. Other implementations of the mechanisms of the illustrative embodiments may also be devised by those of ordinary skill in the art in view of the present description and are intended to be within the spirit and scope of the present invention.

The illustrative embodiments convert areas of input data where there is missing data, areas between data objects, an absence of a data object, or the like (collectively referred to herein as "white space"), in a graphical representation of information into data objects that may be navigable by applications, such as screen readers or the like, such that they may be rendered as audible output. The mechanisms of the illustrative embodiments analyzes such input data, identifies the white spaces, converts these white spaces to data objects, and then provides those white space data objects to a screen reader application that is augmented to utilize the mechanisms of the illustrative embodiments to audibly output the white space information to a user.

It should be noted that the "white space" recognized by the mechanisms of the illustrative embodiments may correspond to any gap between information. Thus, there may be many different terms and associated concepts used to identify this gap in information, all of which are intended to be within the scope of the illustrative embodiments. For example, the white space may be a blank area, empty area, empty space, unspecified area, unused area, unclaimed area, unallocated area, unassigned area, free area, open area, available area, absent area, or other type of area of information in a representation of information. For example, in a system that monitors allocation pools of resources, unallocated resources may be fragmented and disjointed such that the white space presented in a representation of this allocation information is used to represent the optimal combination of any unallocated units. A plethora of other examples of areas of white space will become readily apparent to those of ordinary skill in the art in view of this description, all of which are intended to be within the spirit and scope of the illustrative embodiments.

Figure 3:
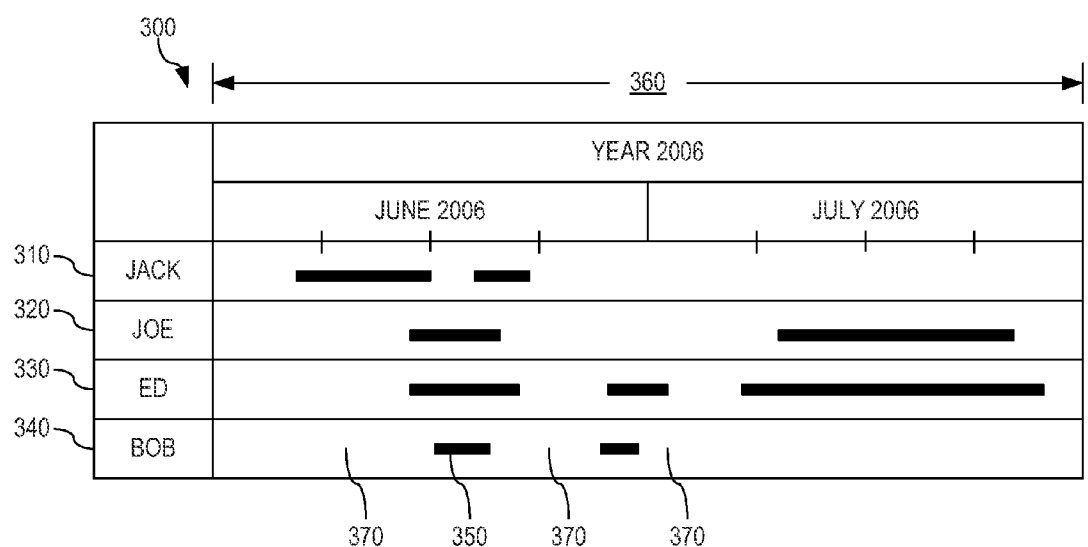
FIG. 3 is an example of a diagram having white space that may be difficult for visually impaired users to perceive.

To better understand the manner by which the mechanisms of the illustrative embodiments operate, reference is first made to an example graphical representation in which white space is present. For example, FIG. 3 is an example of a diagram having white space that may be difficult for visually impaired users to perceive. FIG. 3 is an example of one type of graphical representation of information that is a schedule of when users are involved in working on a particular task. It should be appreciated that the illustrative embodiments may be used with any graphical representation of data and is not limited to graphical representations of schedules or users, or even the particular type of graphical representation (bar graph) shown in FIG. 3. FIG. 3 is only an example and is not intended to state or imply any limitation with regard to the types of graphical representations or input data with which the illustrative embodiments may be utilized.

As shown in FIG. 3, the graphical representation 300 is a bar graph representing a plurality of resources (in this case users) 310-340, and their associated times in which they are involved in completing tasks (represented by the darkened bars 350, over a particular period of time 360. This graphical representation is generated from a data model (not shown), that specifies the periods of time when the users 310-340 are involved in tasks, i.e. a data model having data objects representing the darkened bars 350. The data model does not have any data objects representative of the white spaces 370, i.e. areas of no data, between the darkened bars 350, i.e. between the data objects in the data model. As can be seen from FIG. 3, there are white spaces 370, that exist from a starting time point of the period of time 360 to a first darkened bar 350 associated with the resource, e.g., user, 310-340. Moreover, there are white spaces 370 between darkened bars 350 and white spaces between the end of a last darkened bar 350 and an end time point of the period of time 360.

It should be appreciated that, while not shown in FIG. 3, it is possible that the range of metrics, e.g., period of time 360, may not have any data objects for a particular resource, e.g., users 310-340, in which case the entire range would be represented as a white space 370 which would be converted by the mechanisms of the illustrative embodiments to a white space data object as described hereafter. For example, when a new resource is introduced, e.g., a new employee is hired, at first the resource is not assigned to any tasks so there would be no data for their utilization to be represented in the graphical representation.

With current mechanisms, there is no mechanism for identifying these white spaces 370 and presenting such white spaces 370 in an audible output manner such that visually impaired persons may perceive such white spaces 370. To the contrary, current mechanisms only allow audible output of the darkened bars 350, i.e. the portions of the graphical representation 300 corresponding to data objects present in the data model.

Figure 4:
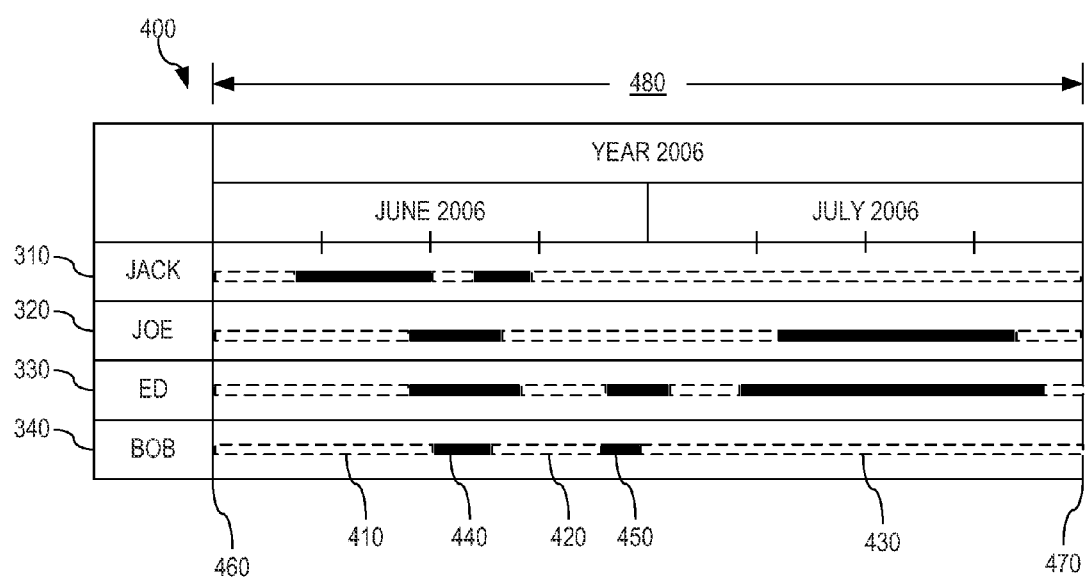
FIG. 4 is an example diagram illustrating objects that may be generated for white space in the diagram of FIG. 3.

FIG. 4 is an example diagram illustrating objects that may be generated for white space in the diagram of FIG. 3 in accordance with one illustrative embodiment. As shown in FIG. 4, with the mechanisms of the illustrative embodiments, the data model is analyzed to identify the data objects in the data model and their associated parameters with regard to one or more given metrics. For example, each data object may have parameters specifying a quantity or sub-range of time which that data object represents, e.g., Jun. 1, 2006 to Jun. 10, 2006. This information may be compared to the parameters for other data objects associated with the same resource or element to determine differences between the parameters of one data object and each of the other data objects. In this way, a relative positioning of the data objects along one or more ranges of parameters may be identified. The differences between the relative positions of these data objects, i.e. the white spaces 370 between data object representations, as well as the differences between a first data object relative to a start point of a given range 360 of parameters, and a difference between a last data object relative to a start point of the given range 360 of parameters and the end point of the range 360, may be identified.

For example, the ending date of a first data object may be compared to the starting date of a subsequent data object and this difference is representative of a white space between these two data objects. Similarly, a starting date of a first data object may be compared to the starting point of the range 360 and the difference between these two may represent a white space 370 present between the starting point of the range 360 and the first data object. In a same way, the ending date of a last data object and the ending point of the range 360 may be compared and the difference is representative of the white space 370 between the last data object and the ending point of the range 360.

Data objects corresponding to these white spaces may then be generated, which are referred to herein as white space data objects. The parameters for the white space data objects 410-430 may be set based on the parameters of the data objects, starting point, or ending point representing the boundaries of the white space 370. Thus, for the white space 410 present between the starting point 460, of the range 480 and the first data object 440, the parameters have a low value corresponding to the starting point 460 of this type, and a high value corresponding to a lowest value of this parameter associated with the first data object 440. For the white space 420 present between data objects, e.g., data objects 440 and 450, the parameters for the white space data object 420 have a low value corresponding to the highest value of the parameter of the first data object 440 and a high value corresponding to the lowest value of the parameter of the subsequent data object 450 in the graphical representation 400. For the white space 430 present between a last data object 450 and the end point 470 of the range 480, the parameters for the white space data object 430 have a low value corresponding to a highest value of the parameter of the last data object 450 and a high value corresponding to a lowest value of the parameter of the end point 470 of the range 480.

These white space data objects 410, 420 and 430 are then created and stored in association with the data model, but may or may not be stored as part of the data model itself. These white space data objects 410, 420 and 430 may be provide to applications invoking the mechanisms of the illustrative embodiments as navigable objects that the application can identify and use as a basis for performing functions, e.g., generating audible output. In one illustrative embodiment, for example, an application may be provided with a user selectable option for invoking white space reading. The user may select such an option which then causes the application to invoke the mechanisms of the illustrative embodiments. The mechanisms of the illustrative embodiments may be implemented as a portion of the application, in hardware accessible via a device driver and a call to the device driver, a library of functions that may be accessible via calls to the library either from the application or an operating system, or the like.

When the user selects the option to invoke the illustrative embodiments, the white space data objects may be returned either separately or in conjunction with the data objects from the data model. The white space data objects, when generated, may comprise an identifier identifying them as white space data objects such that they may be distinguishable from the regular data objects present in the original data model. Alternatively, these white space data objects may be stored in a separate white space data model in which case they are distinguishable by virtue of being part of the white space data model and not part of the original data model.

The application may then identify these white space data objects and present them in a manner that the user is able to discern information about the white spaces between data objects. For example, if a user wishes to know when a particular person is not scheduled to work on a task, the application may present the white space data objects in an audible manner such that the user is informed of when the person is not scheduled to work on the task, i.e. is free. For example, the application may present an audible output of "Jack is free from Jun. 1, 2006 to Jun. 10, 2006; Jun. 20, 2006 to Jul. 10, 2006, and Jul. 30, 2006 onwards." Moreover, the user may specify a sub-range within the range, the sub-range being a range that the user is interested in. For example, the user may wish to know when in June the person is available and the application may respond with "Jack is available from June 1 to June 10 and June 20 to June 30." Any suitable audible output may be generated based on the identification of the white space data objects.

In some illustrative embodiments, one or more filters may be employed to focus the operation of the illustrative embodiments on white spaces that have a sufficiently large size to be of interest. For example, a filter may have parameters specifying a particular minimum range of metrics or size of a white space, e.g., at least 10 minutes, at least 100 MB, or any other range or size of metrics, that is required for that white space to be processed by the mechanisms of the illustrative embodiments and converted into a white space data object. White spaces that are smaller than this minimum size will not be processed and converted into white space data objects while those that meet or exceed the minimum range or size will be included in the processing and will be converted to white space data objects in the manner described herein. In this way, these illustrative embodiments may remove the "noise" of unsuitable white spaces.

Furthermore, these filters may apply various other criteria to the selection of which white spaces in a data model or graphical representation of the data model may be included for processing by the illustrative embodiments such that they are converted to white space data objects. For example, other attributes associated with the white space may be included as filter criteria including required charge codes, e.g., premium shift, required resource type, required time of day, required storage capacity, particular resource names, or any other attribute of the white space which may be used to distinguish the white space from other white spaces that are not of interest.

Moreover, these attributes used in the filters may be attributes describing non-white spaces that are associated with the white spaces being considered for inclusion in the processing of the illustrative embodiments. For example, a filter criteria may be to consider only white spaces where the resource was allocated for a predetermined amount of time just prior to the white space or a white space in which the resource is allocated just after the white space for a predetermined amount of time. Similarly, a filter criteria may be to consider only white spaces where the resource has a certain amount of the resource allocated just prior to the white space or just after the white space, a same resource was allocated at a same time in a previous time frame, e.g., day, week, month, etc., or the like.

It can be appreciated that there are many ways in which white spaces may be filtered to determine whether they are to be included in the processing of the illustrative embodiments for converting the white spaces to white space data objects. All of these various ways of defining filters are considered to be within the spirit and scope of the illustrative embodiments. The filter criteria or parameters may be specified by a user when configuring the mechanisms of the illustrative embodiments, may be automatically determined based on an analysis of the data model or representation of the data model, e.g., based on an average size of the white spaces in the data model or representation of the data model, or may be pre-defined.

It should be appreciated that rather than time, the graphical representations 300 and 400 of information may use any metric and may represent any resource and any desired information about such resources. For example, other metrics that may be utilized may include power, money, effort, energy, or any other, or combination of, a plethora of possible metrics. The resources may include, for example, human resources, software resources, hardware resources, combinations of these resources, or any of, or combinations of, a plethora of other types of resources. The graphical representation may represent a particular range of metrics and data objects may represent various quantities or various sub-ranges of these metrics in associated with their corresponding one or more resources. Furthermore, the graphical representation may take many different other forms including, but not limited to, pie charts, line graphs, VN diagrams, clustering representations, or any other graphical representation in which white spaces or areas of no data may be indicative of information that may be of interest to a user.

Figure 5:
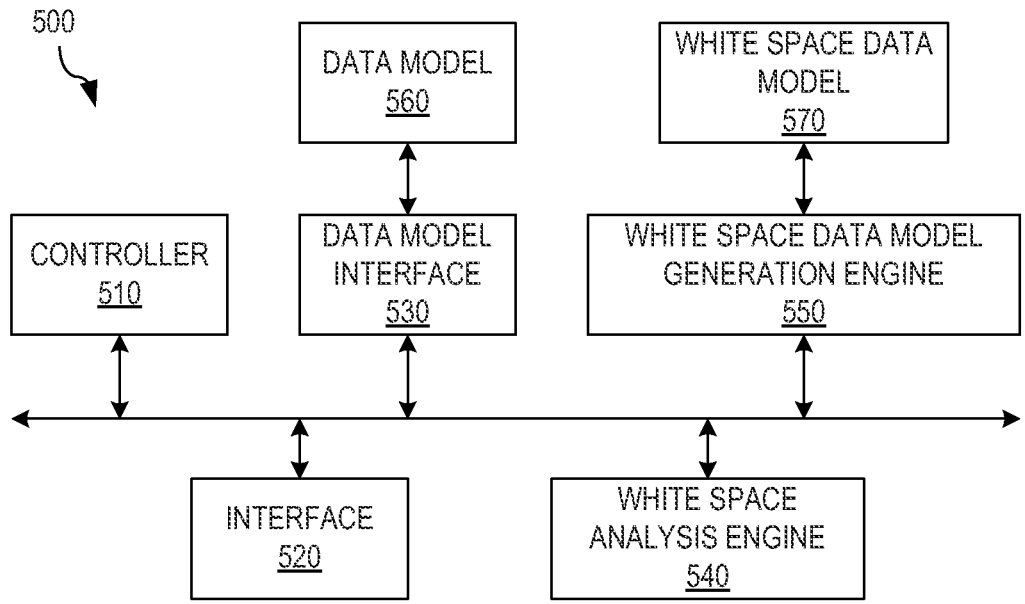
FIG. 5 is an example block diagram of the primary operational elements in accordance with one illustrative embodiment.

FIG. 5 is an example block diagram of the primary operational elements in accordance with one illustrative embodiment. The elements shown in FIG. 5 may be implemented in software, hardware, or any combination of software and hardware. In one illustrative embodiment, the elements in FIG. 5 are implemented as software instructions executed on one or more hardware-implemented processors of one or more computing devices. Alternatively, these elements may be implemented in hardware circuitry, firmware, or the like. Alternatively, some elements of FIG. 5 may be implemented as software instructions executed on one or more hardware-implemented processors while other elements may be implemented in hardware, firmware, or the like. Still further, not all of the elements in FIG. 5 need be present on the same computing device but may be distributed across a plurality of computing devices.

For purposes of the following description, it is assumed that the operation of a white space identification mechanism 500 has been initiated in some manner such that the operation of the illustrative embodiments as described hereafter is implemented. The initiation of the operation of the white space identification mechanism 500 may be performed in many different ways. For example, a user may invoke the operation of the white space identification mechanism 500 by selecting a menu option (which with visually impaired users may involve keyboard activation of a menu option, a voice command selection of a menu option, or the like) or otherwise entering a command, via an appropriate user interface, to initiate the white space identification mechanism 500. As another example, the initiation of the white space identification mechanism 500 may be in response to an accessibility setting of an operating system, an application, or the like, that causes the white space identification mechanism 500 to be initiated when the operating system, application, or the like, is initiated. Other mechanisms for initiated the white space identification mechanism 500 will become apparent to those of ordinary skill in the art in view of the present description and are intended to be within the spirit and scope of the illustrative embodiments.

As shown in FIG. 5, the primary operational elements of a white space identification mechanism 500 in accordance with one illustrative embodiment comprises a controller 510, an interface 520, a data model interface 530, a white space analysis engine 540, and a white space data model generation engine 550. The control controls the overall operation of the white space identification mechanism 500 and orchestrates the operation of the other elements 520-550.

The interface 520 provides a communication interface through which calls to the functionality of the white space identification mechanism 500 may be received from an application, an operating system, a user, or the like, specifying parameters for the white space identification. In addition, the interface 520 provides communication interface through which results of the white space identification may be provided to a caller of the white space identification functionality, e.g., an application, operating system, user, or the like.

In one illustrative embodiment, the call to the white space identification mechanism 500 may include one or more parameters specifying criteria by which the white space identification should be performed. For example, the white space identification call may comprise one or more parameters for specifying a data model upon which the white space identification is to be performed, a range of metrics of interest over which such white space identification should be performed, optionally any filter parameters and/or a filter identifier for specifying a particular pre-defined filter to be applied, a currently displayed diagram with which to associate the white space representation generated by the illustrative embodiments, an identifier of a graphical representation from the white space identification mechanism 500 may obtain a link or access method to the data model, and/or the like.

The data model interface 530 provides a communication interface through which a data model 560 may be retrieved for analysis by the white space identification mechanism 500. The data model 560 may correspond, for example, to a data model identified in parameters of the call to the white space identification mechanism 500, for example. The data model 560 may be retrieved from a storage system storing the data model 560, such as one or more hard drives, network attached storage systems, or the like, that are accessible by the computing device(s) implementing the mechanisms of FIG. 5. The data model 560 comprises one or more portions of data, e.g., data objects, specifying data elements to be used to generate elements within a graphical representation of the data model 560.

The white space analysis engine 540 comprises logic that analyzes the data model 560 via interface 530 to identify white space within the data model 560 in accordance with the parameters specified in the call to the white space identification mechanism 500, e.g., the range of metrics of interest. For example, for each data model element of interest, e.g., resource, user, or other type of data model element, and for each type of metric of interest, white spaces between portions of data (data objects) and between portions of data (data objects) and the boundaries of the range of metrics of interest, may be identified. As an example, the white space between a start point of the range of interest and a first data object is identified, the white space between the end of the nth data object and the start of the n+1 data object is identified, and the white space between a last data object and the end point of the range of interest is identified.

The identified white spaces may be communicated by the white space analysis engine 540 to the white space data model generation engine 550. The white space data model generation engine 550 generates a white space data object for each of the white spaces identified by the white space analysis engine 540. For example, for each data model element of interest, e.g., resource, user, or other type of data model element, and for each type of metric of interest, a white space data object is generated for each of the white spaces between portions of data (data objects) and between portions of data (data objects) and the boundaries of the range of metrics of interest. As an example, a white space data object is generated for white spaces between a start point of the range of interest and a first data object, the white spaces between the end of the nth data object and the start of the n+1 data object, and the white spaces between a last data object and the end point of the range of interest is identified.

These white space data objects may be combined with the data model 560, in which case white space data objects may comprise identifiers that distinguish them from other data objects already present in the original data model 560. Alternatively, a separate white space data model 570 may be generated that comprises only white space data objects generated by the mechanisms of the illustrative embodiments.

Either the updated data model 560 or the data model 560 and the white space data model 570, may be returned to the calling application, operating system, or user via the interface 520. The application or operating system may then utilize the white space data objects, either in the updated data model 560 or the white space data model 570, to perform various operations. For example, the white space data objects may be presented for review by a user, navigated by a user (i.e. move between white space data objects in a linear or non-linear fashion by use of a user input device or the like), or otherwise manipulated by the user via the corresponding application, operating system, or the like. In one illustrative embodiment, the white space data objects are operated on by an accessibility application for speaking displayed data such that visually impaired users may be informed of what is being graphically represented. In this case, the accessibility application may speak or otherwise audibly indicate the white spaces in the graphical representation in a manner that it may be perceived by the visually impaired person.

The actually speaking or audible indicator of the white spaces may take many different forms. For example, in one illustrative embodiment, a descriptive voice may be used to describe the details of attributes of the white spaces, e.g., cost, location, resource type, time range, etc. One or more templates for sentence construction may be used in which attributes are inserted into the templates and spoken by an automated voice mechanism. Special voice features may be utilized to indicate the difference between white space data objects and data objects of the data model, e.g., open spaces versus used or allocated spaces. Such voice features may, for example, use a normal sounding voice for allocation spaces and an accented voice for open spaces or white spaces.

In addition, or in the alternative, earcons (i.e. a brief, distinctive sound used to identify an event or object) can be associated with white space data objects and used to identify to the user the existence of a white space data object. Different earcons can be used to indicate data objects from white space data objects, e.g., allocated/unallocated spaces, starting/ending times of white spaces, which swim lanes the white space is present in, or the like. Such earcons can be provide sound queues that are in the foreground or the background, e.g., a "ding" sound in the foreground or a "wind" sound in the background. Any earcons or earcon combinations may be used without departing from the spirit and scope of the illustrative embodiments.

Thus, the illustrative embodiments provide a mechanism by which white spaces in a data model and its corresponding graphical representation may be identified and used as a basis for generating white space data objects that are able to be processed by applications. In particular, by representing white spaces in a data model and its graphical representation as white space data objects, accessibility applications may process these white space data objects so that they may be output in a way that allows them to be perceived by impaired users. However, it should be appreciated that the illustrative embodiments are useful for all users, even those without impairments, because the illustrative embodiments allow users to navigate, i.e. move between white space data objects in a linear or non-linear fashion, review, and manipulate white spaces as actual white space data objects rather than being limited to navigating, reviewing, and manipulating only data objects in the data model.

Figure 6:
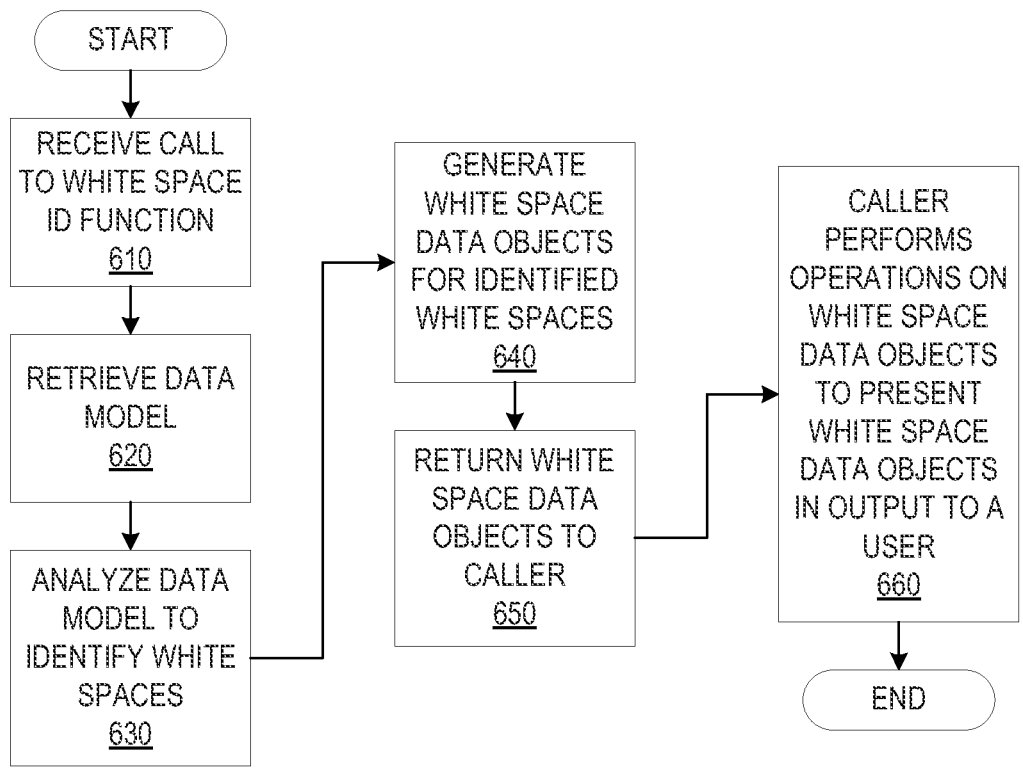
FIG. 6 is a flowchart outlining an example operation for representing white space of a graphical representation in a manner perceivable by visually impaired users in accordance with one illustrative embodiment.

FIG. 6 is a flowchart outlining an example operation for representing white space of a graphical representation in a manner perceivable by visually impaired users in accordance with one illustrative embodiment. The operation outlined in FIG. 6 may be performed, for example, by a white space identification mechanism in accordance with the illustrative embodiments which may be implemented in hardware, software, or any combination of hardware and software, as described above.

As shown in FIG. 6, the operation starts by receiving a call to the white space identification functionality of the illustrative embodiment (step 610). A data model corresponding to parameter specified in the call is retrieved (step 620) and is analyzed to identify white spaces between the data objects in the data model and white spaces between the data objects and the boundaries of a range of metrics of interest as specified by the parameters of the call (step 630). White space data objects are then generated for each of the identified white spaces (step 640). The white space data objects are returned to the caller of the white space identification mechanism of the illustrative embodiments (step 650). The caller may then perform operations on the white space data objects, such as generating audible output identifying the white space data objects or otherwise presenting the white space data objects in a manner desired by a user (step 660). In one illustrative embodiment, this output is an audible output that allows visually impaired users to perceive the white space in a graphical representation of a data model. The operation then terminates.

It should be noted that while the illustrative embodiments are described in terms of converting white spaces in graphical representations of information to white space data objects that may be identified to users, e.g., visually impaired users, the illustrative embodiments are not limited to use with graphical representations. To the contrary, the illustrative embodiments may be used with any representation of information in which white spaces may be present.

Furthermore, while the illustrative embodiments have been described above with regard to processing a data model to identify white spaces, the illustrative embodiments are not limited to such. Rather, in other illustrative embodiments, the white space detection can be done without analyzing the underlying data model but instead analyzing the graphical representation data that is output on a display. For example, the mechanisms of the illustrative embodiments may navigate the displayed ranges or data actually being displayed, e.g., the rectangular bars in a bar graph representation, and learn the range values from metadata describing the output on the display. The screen pixels that these rectangular bars or other displayed objects occupy may then be identified from the display metadata. The white space identification mechanism may then insert or draw additional bars in between existing bars based on the white spaces identified based on the display metadata. These new white space bars may then be added to the display metadata such that a screen reader or other mechanism is able to identify them as white space bars and generate an appropriate output to inform a user of the existence of these white space bars in the displayed output.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising at least one hardware-implemented processor, for representing white space in a graphical representation of a data model, comprising:

analyzing, by the data processing system, output data associated with the data model that is to be output to a user via an output device to identify white spaces in the output data, wherein the output data is a data model comprising a plurality of data model objects representing a usage or allocation of one or more resources, wherein the identified white spaces comprise portions of a range of metrics of output data values where the output data does not have data objects representing those portions of the range of metrics of output data associated with the identified white spaces, and wherein analyzing the output data that is to be output to the user via the output device comprises:

identifying at least one of gap between a start point of the range of metrics of the output data and a first data object along the range of metrics of output data, a gap between successive data objects along the range of metrics of output data, and a gap between a last data object and an end point of the range of metrics of output data, in the data model, wherein the gaps are the identified white spaces;

creating, by the data processing system, for each identified white space, a white space data object thereby forming white space data objects, wherein the white space data objects represent portions of the data model where the one or more resources are not used or are unallocated and wherein the creating, for each identified white space, the white space data object comprises:

generating the white space data object in the data model having attributes corresponding to attributes of the identified white spaces determined based on the attributes of data objects in the data model adjacent to the white space;

providing, by the data processing system, the white space data objects to an application running in the data processing system or a different data processing system; and performing, by the application running in the data processing system or a different data processing system, an operation on the white space data objects to output the white space data objects in a manner that identifies the white space data objects differently from non-white space data objects in the output data.

2. The method of claim 1, wherein the operation performed on the white space data objects comprises generating an audible output representing the white space data objects and outputting the audible output.

3. The method of claim 2, wherein the audible output comprises a voice output specific to the white space data objects.

4. The method of claim 3, wherein the voice output provides a description of the white space data objects.

5. The method of claim 2, wherein the audible output comprises one or more earcons, wherein the one or more earcons are specific for identifying the white space data objects.

6. The method of claim 1, wherein the application is a screen reader application, and wherein the screen reader application generates an audible output identifying the white space data objects such that a user is able to perceive the white space data objects differently from audible output identifying other data objects.

7. The method of claim 1, wherein the output data is display data for representing a data model on a display device, and wherein analyzing the output data that is to be output to a user via an output device comprises:

analyzing pixel data in the display data to identify portions of the display data corresponding to data objects; and inserting the white space data objects between pixels corresponding to different data objects or a data object and either a start point of the range of metrics or an end point of the range of metrics.

8. A computer program product comprising a non-transitory computer readable storage medium having a computer readable program stored therein, wherein the computer readable program, when executed on a computing device, causes the computing device to:

analyze output data associated with the data model that is to be output to a user via an output device to identify white spaces in the output data, wherein the output data is a data model comprising a plurality of data model objects representing a usage or allocation of one or more resources, wherein the identified white spaces comprise portions of a range of metrics of output data values where the output data does not have data objects representing those portions of the range of metrics of output data associated with the identified white spaces, and wherein the computer readable program to analyze the output data that is to be output to the user via the output device further causes the computing device to:

identify at least one of a gap between a start point of the range of metrics of the output data and a first data object along the range of metrics of output data, a gap between successive data objects along the range of metrics of output data, and a gap between a last data object and an endpoint of the range of metrics of output data, in the data model, wherein the gaps are the identified white spaces;

create, for each identified white space, a white space data object thereby forming white space data objects, wherein the white space data objects represent portions of the data model where the one or more resources are not used or are unallocated and wherein the computer readable program to create, for each identified white space, the white space data object further causes the computing device to:

generate the white space data object in the data model having attributes corresponding to attributes of the identified white spaces determined based on the attributes of data objects in the data model adjacent to the white space;

provide the white space data objects to an application; and perform, by the application, an operation on the white space data objects to output the white space data objects in a manner that identifies the white space data objects differently from non-white space data objects in the output data.

9. The computer program product of claim 8, wherein the operation performed on the white space data objects comprises generating an audible output representing the white space data objects and outputting the audible output.

10. The computer program product of claim 9, wherein the audible output comprises a voice output specific to the white space data objects.

11. The computer program product of claim 10, wherein the voice output provides a description of the white space data objects.

12. The computer program product of claim 9, wherein the audible output comprises one or more earcons, wherein the one or more earcons are specific for identifying the white space data objects.

13. The computer program product of claim 8, wherein the application is a screen reader application, and wherein the screen reader application generates an audible output identifying the white space data objects such that a user is able to perceive the white space data objects differently from audible output identifying other data objects.

14. The computer program product of claim 8, wherein the output data is display data for representing a data model on a display device, and wherein the computer readable program causes the computing device to analyze the output data that is to be output to a user via an output device by:

analyzing pixel data in the display data to identify portions of the display data corresponding to data objects; and inserting the white space data objects between pixels corresponding to different data objects or a data object and either a start point of the range of metrics or an end point of the range of metrics.

15. An apparatus, comprising:

a processor; and a memory coupled to the processor, wherein the memory comprises instructions which, when executed by the processor, cause the processor to:

analyze output data associated with the data model that is to be output to a user via an output device to identify white spaces in the output data, wherein the output data is a data model comprising a plurality of data model objects representing a usage or allocation of one or more resources, wherein the identified white spaces comprise portions of a range of metrics of output data values where the output data does not have data objects representing those portions of the range of metrics of output data associated with the identified white spaces, and wherein the instructions to analyze the output data that is to be output to the user via the output device further cause the processor to:

identify at least one of a gap between a start point of the range of metrics of the output data and a first data object along the range of metrics of output data, a gap between successive data objects along the range of metrics of output data, and a gap between a last data object and an end point of the range of metrics of output data, in the data model, wherein the gaps are the identified white spaces;

create, for each identified white space, a white space data object thereby forming white space data objects, wherein the white space data objects represent portions of the data model where the one or more resources are not used or are unallocated and wherein the instructions to create, for each identified white space, the white space data object further cause the processor to:

generate the white space data object in the data model having attributes corresponding to attributes of the identified white spaces determined based on the attributes of data objects in the data model adjacent to the white space;

provide the white space data objects to an application; and perform, by the application, an operation on the white space data objects to output the white space data objects in a manner that identifies the white space data objects differently from non-white space data objects in the output data.

16. The apparatus of claim 15, wherein the operation performed on the white space data objects comprises generating an audible output representing the white space data objects and outputting the audible output.

17. The apparatus of claim 16, wherein the audible output comprises a voice output specific to the white space data objects.

18. The apparatus of claim 17, wherein the voice output provides a description of the white space data objects.

19. The apparatus of claim 16, wherein the audible output comprises one or more earcons, wherein the one or more earcons are specific for identifying the white space data objects.

20. The apparatus of claim 15, wherein the application is a screen reader application, and wherein the screen reader application generates an audible output identifying the white space data objects such that a user is able to perceive the white space data objects differently from audible output identifying other data objects.

21. The apparatus of claim 15, wherein the output data is display data for representing a data model on a display device, and wherein the instructions cause the processor to analyze the output data that is to be output to a user via an output device by:

analyzing pixel data in the display data to identify portions of the display data corresponding to data objects; and inserting the white space data objects between pixels corresponding to different data objects or a data object and either a start point of the range of metrics or an end point of the range of metrics.

* * * * *